United States Patent
Tieniber

[15] 3,650,880
[45] Mar. 21, 1972

[54] POROUS POLYURETHANES AND METHOD OF MANUFACTURE

[72] Inventor: Albert C. Tieniber, Moorestown, N.J.
[73] Assignee: Hooker Chemical Corporation, Niagara Falls, N.Y.
[22] Filed: Nov. 20, 1968
[21] Appl. No.: 777,428

Related U.S. Application Data

[63] Continuation-in-part of Ser. No. 691,220, Dec. 18, 1967, abandoned.

[52] U.S. Cl. ............... 161/89, 117/63, 156/77, 156/231, 156/239, 156/243, 156/246, 156/247, 161/159, 161/190, 161/DIG. 2
[51] Int. Cl. ............... B32b 3/00, B32b 27/12
[58] Field of Search ............... 161/87–95, 190, 161/159, 160, DIG. 2, 161; 117/100 R, 63, 66, 76; 156/155, 77, 231, 239, 243, 246, 247

[56] References Cited

UNITED STATES PATENTS

| | | | |
|---|---|---|---|
| 3,496,042 | 2/1970 | Wyness | 156/155 X |
| 3,269,882 | 8/1966 | Willy | 161/67 X |
| 3,288,729 | 11/1966 | Waterman et al. | 260/2.5 |
| 3,262,805 | 7/1966 | Aoki | 161/161 X |
| 3,130,505 | 4/1964 | Markevitch | 161/DIG. 2 |
| 3,100,721 | 8/1963 | Holden | 117/63 |
| 2,983,960 | 5/1961 | Jilge | 156/155 X |

Primary Examiner—Robert F. Burnett
Assistant Examiner—Mark A. Litman
Attorney—Peter F. Casella, Raymond F. Kramer and James F. Mudd

[57] ABSTRACT

A porous, breathable, polymer-coated fabric is produced by applying a layer of film-forming flexible polyurethane solution to a carrier member; heating said layer sufficiently to form a solidified film on said carrier member; cooling said film and carrier member; applying a second layer of film-forming polymer solution on the first film on the member; applying to said second layer a fabric material; and heating the resulting structure to form an unitary article comprised of the fabric and both polymer layers. The carrier member can be stripped from the first polymer layer. Plastic films can also be produced.

15 Claims, 1 Drawing Figure

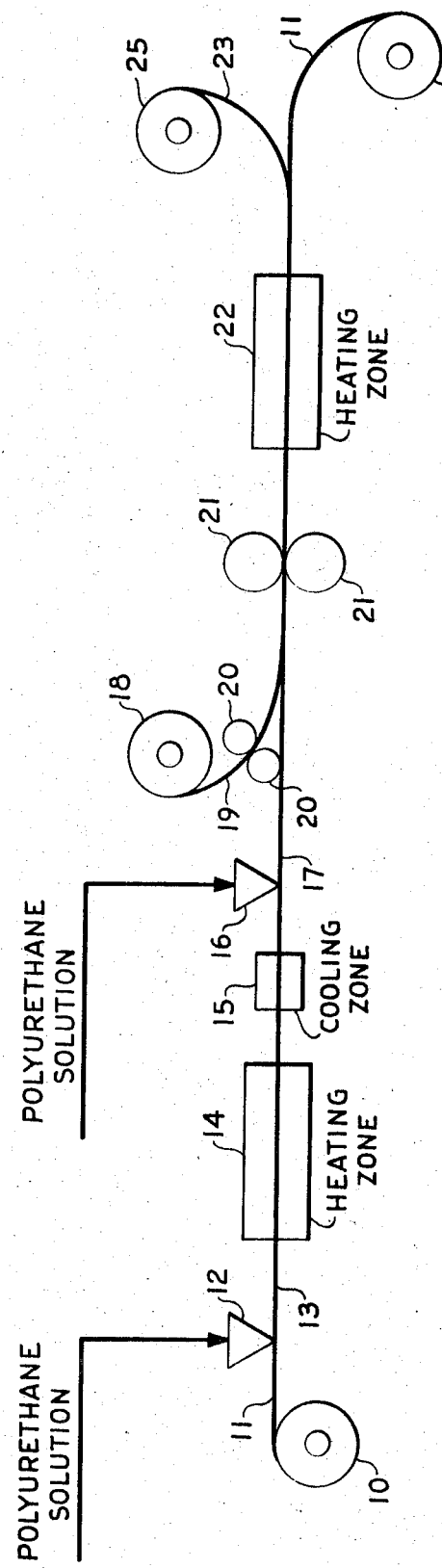

POROUS POLYURETHANES AND METHOD OF MANUFACTURE

REFERENCE TO PRIOR APPLICATION

This is a continuation-in-part of application Ser. No. 691,220, filed Dec. 18, 1967, now abandoned.

BACKGROUND OF THE INVENTION

Attempts to make porous coatings in the past have involved forming a polymer film and then mechanically perforating the film. The procedure involves additional steps and has not provided satisfactory porous polymer films.

It is the object of this invention to produce polymer films or polymer coated fabrics which have uniform or controlled porosity and/or breathability. It is also the object of this invention to provide said fabrics which are easy and economical to fabricate. A further object of this invention is to provide fabrics which are dry-cleanable and are abrasion resistant. A still further object is to provide fabrics which are resistant to water and common household solvents. Another object of this invention is to provide polymer films or polymer coated fabrics which have an aesthetic appeal.

SUMMARY OF THE INVENTION

This invention relates to new porous, breathable, continuous polymer films or polymer coated fabrics and a method for their production. More particularly this invention relates to porous breathable, continuous polymer films or polymer coated fabrics produced by applying layers of film-forming flexible polyurethane solutions to said fabric.

DESCRIPTION OF THE PREFERRED EMBODIMENT

The process of the invention can be illustrated by reference to the figure which is a schematic flow diagram of one embodiment of the invention.

The process of the invention employs a supply roll 10 of a temporary carrier or backing sheet or web 11 which is used during certain stages of the process. The backing sheet, or web, can be any suitable material from which the final composite fabric can be readily stripped mechanically, and for that reason the web has a surface which possesses a low degree of adhesive affinity for the film-forming flexible polyurethane solution employed in this invention. Web 11 may be a polished or textured metal band, or belt of fabric, or paper having a surface treated in any manner well known in the art to provide it with the desired surface characteristic and inertness against permanent integral bonding to the film-forming polyurethane solution, and heat resistant so as not to be affected by the drying heat and so as to be strippably attached thereto. The carrier member should be solvent resistant and is preferably substantially non-porous.

A film-forming polyurethane solution is applied to the upper surface of the carrier by suitable discharge means; such as a reverse roller coater 12. Many solutions of a flexible polyurethane can be employed in this invention as described hereinafter. The film-forming polyurethane on the carrier is subjected to heat or drying. For this purpose, the coated carrier 13 is passed through one or more heating zones 14, such as heating ovens or heating plates, to remove the volatile component and form the desired polyurethane film. Various heating means that are commercially available can be employed, e.g., compartmented ovens equipped with hot gas ducts and distribution means, or heated by radiant heaters, and the like. The heating zone is maintained in the temperature range of about 35° to about 150° centigrade, preferably about 50° to 120° centigrade. When the coated carrier leaves the heating zone, it can be subjected to cooling by a suitable cooling means 15, if desired.

The coated carrier is then fed past another suitable discharge means 16, containing a film-forming flexible polyurethane solution and a second layer of film-forming flexible polyurethane solution is coated on the first film. The second polyurethane solution may or may not be the same as the first polyurethane solution. Deposition of either polyurethane solution onto the carrier can be accomplished by any well known method, such as knife coating, brush coating, or dipping, spraying, and the like.

Any well known knitted, woven, nonwoven or stretchable textile fabric 19 is next applied from supply roll 18 through guide rolls 20 to the second layer of polyurethane, while the latter is still in an adhesive condition. Generally, the fabric is allowed to rest by its own weight upon the coated carrier 17. Because of the adhesive properties of the second polyurethane solution, it adheres to both the pre-cast polyurethane film on the carrier and to the fabric material. In other words, after the second film-forming polyurethane solution has been cast onto the exposed surface of the pre-cast or first film which results from the drying in the heating means, and while the second film-forming coating is still in a solution, or adhesive state, the fabric is laid onto said second coating and sinks into the body of said second coating. If desired, an accurately controlled pressure can be applied to the fabric to bring it into more intimate contact with said second coating. If desired, the pressure on the material can be provided by suitable pressure rollers 21 and can be such as to force the fabric material to the required depth into the thickness of said second polyurethane solution.

After the fabric material has been laid on the carrier, the composite structure is fed through a second heating zone 22, of the type used before to remove any volatile compounds from the polyurethane solution to form the desired film. The second heating zone is maintained in the temperature range of about 35° to 150° centigrade, preferably about 50° to 120° centigrade. After leaving the heating zone, the composite material consists of the carrier with two cast films and the fabric. Integral and permanent adhesion is obtained between the two films. The fabric is also bonded with permanent adhesion to second polyurethane composition by chemical or mechanical adhesion. After leaving the heating zone, the carrier can be cooled and mechanically stripped in any well-known manner from the composite sheet 23 consisting of the superimposed films and fabric, and if desired the carrier 11 can be rerolled on a roller 24 for reuse in the process. The composite sheet is at the same time rolled on a suitable receiving roller 25.

Generally, but not necessarily, in continuous operation of the process, the carrier is continuously moved in an essentially horizontal plane and the solutions and fabric are applied to the upper surface of the web from fixed stations.

The polyurethanes are produced by reacting an organic polyisocyanate, generally a diisocyanate, with a selected polyol, usually a diol, such that the cross-linking density of the urethane polymer will be low. Generally a polyether polyol or a polyester polyol is employed having a hydroxyl number in the range of about 30 to 100, preferably about 40 to 70. Generally, the polyethers are based on condensates of dihydric alcohols, such as ethylene glycol, reacted with ethylene oxide or other alkylene oxide to provide terminal hydroxyl groups. The polyesters employed are reaction products of a polycarboxylic compound, preferably a dicarboxylic compound, including acids, anhydrides and acid halides, such as adipic, succinic, glutaric and the like, with an alcohol, preferably a dihydric alcohol such as ethylene glycol, 1,4-butanediol, 1,6-hexanediol, and the like. A free unreacted glycol of similar type can be admixed with the polyester to vary the properties of the polyurethanes. Other hydroxyl containing polymers, such as polylactones and polycaprolactones can be employed. The flexible polyurethane employed is preferably elastomeric. Cross linkable polyurethanes can be employed, if desired. Various diisocyanates can be employed in preparing the polyurethanes. Especially useful is diphenylmethane diisocyanate.

The solutions of the flexible polyurethane can also contain catalysts, such as tertiary amines, surface active agents, such as silicones, and other additives, such as talc, carbon black, dyes, colorants, fillers and flame retardants. The solvent for the polyurethane is generally a combination of an alkylamide, an aromatic hydrocarbon or an aliphatic ketone, preferably a combination of all three. Suitable alkylamides have the formula

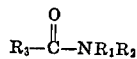

wherein $R_1$ and $R_2$ are alkyl, and $R_3$ is selected from the group consisting of hydrogen and alkyl. The alkyl groups generally have one to about six carbon atoms. Typical amides that can be used in the practice of the invention include: dimethylformamide, diethylformamide, dipropylformamide, methylhexylformamide, dimethylacetamide, diethylacetamide, methylhexylacetamide, and the like. Mixtures of any of the foregoing amides can also be employed. Suitable aromatic hydrocarbons include benzene, toluene, xylene, ethylbenzene, and the like. Suitable aliphatic ketones have three to nine carbons atoms and include acetone, methyl ethyl ketone, diethyl ketone, methyl propyl ketone, dibutyl ketone, and the like. Other less preferred solvents include dimethylsulfoxide, tetrahydrofuran and cyclohexanone. Solution concentration can vary depending on the choice of solvents, but will generally be in the range of about 10 to 60 weight percent solids, preferably about 30 to 50 weight percent solids based on the weight of the solution.

It will be obvious that the invention is not limited to any particular kind of fabric material and, in general, porous material such as knitted goods, woven textiles or nonwoven textiles, can be used. The fabric can be made of natural or synthetic fibers, such as cellulosic fibers, jute, cotton, wool, nylon, polyester, rayon, acetates, polyurethanes, acrylics and polyolefins. Moreover other cellulosic materials can be used as the fabric material, such as paper, cardboard, and the like. Also useful are foamed materials such as expanded vinyl, foamed polyurethane and foamed rubber sheets. "Open-celled" foams are preferred.

While the foregoing description involves polyurethane solutions as the deposited layers, other materials can be used. For example, the intermediate film can be a natural or synthetic material, such as an expanded or foamed polyvinyl chloride homopolyer or copolymer, a foamed polyurethane, a foamed rubber or other polymers. The foaming agents and other additives usually associated with these foamed materials are employed. "Open-celled" foams are preferred.

The following examples are presented to illustrate the invention. It is to be understood that the examples are not to be construed as limiting the invention. In this specification and claims, all temperatures are given in degrees centigrade and all parts are by weight, unless otherwise indicated.

EXAMPLE 1

A polyurethane coating solution was prepared of components comprising 107.1 parts of a solution comprised of 137 parts of a thermoplastic polyurethane of a linear, hydroxyl-terminated ethylene glycol —adipate polyester of 2000 molecular weight, butanediol, and diphenylmethane diisocyanate, in solution in a mixture of 140 parts of dimethylformamide and 100 parts of toluene: 2.9 parts of carbon black, and 5 parts of methyl ethyl ketone. The solution was coated on an embossed release paper with a reverse roll coater. Thereafter the solution was dried by drawing the release paper through two heating ovens at the rate of 8 yards per minute. The coated paper was drawn through a 30 foot 5 inch first oven, which was maintained at 107° centigrade and had a maximum air circulation of 7600 cubic feet per minute. The coated paper then passed through a 24 foot, 4 inch second oven which had a maximum air circulation of 3790 cubic feet per minute and also had a temperature of 107° centigrade. Thereafter the paper-film composite was drawn over two cooling drums. The resulting structure, comprised of the embossed release paper and 2.5 mils of dried polyurethane coating, was passed under a knife over roller coater which applied additional polyurethane coating solution to the fabrication. Next, cotton drill was continuously laid on the second coating solution and the coated paper was drawn through pressure rollers. The laminated structure was drawn through a 72.5 foot oven maintained at 107° centigrade. This oven had two zones. The first zone had a maximum air capacity of 7600 cubic feet per minute and the second zone had a maximum air capacity of 1,500 cubic feet per minute. Thereafter the composite structure was cooled, the release paper was separated from the coated cotton drill and the paper and coated fabric were separately collected on supply rolls. The cotton drill had a polyurethane coating which was 3 mils thick. The composite fabric was breathable. The fabric was made into automobile seat covers and into attache cases.

EXAMPLE 2

Example 1 was repeated except that brushed nylon tricot was employed in place of the cotton drill. The resulting coated nylon contained a polyurethane coating which was 3 mils thick. The coated nylon tricot was breathable and was used to make automobile seat covers and sport jackets.

EXAMPLE 3

Example 1 was repeated except that an open cell, foamed polyvinyl chloride sheet was employed in place of the cotton drill. The resulting structure has a 3 mil polyurethane coating on the foamed vinyl sheet.

EXAMPLE 4

A polyurethane solution was made up of 104.13 parts of the polyurethane polymer solution of Example 1, 0.10 parts of soya lecithin, 4.06 parts of methyl ethyl ketone, and 1.71 parts of carbon black. A film of the polyurethane solution was cast upon embossed release paper and dried in a circulated air oven at 95° centigrade for 7 minutes to yield a dry film 3½ mils thick. A second coat of the same solution was cast on the exposed surface of the dried film and napped, knitted cotton fabric was laid into the wet film with the napped side adjacent the wet film. The composite, still on release paper, was heated in an oven at 95° centigrade for 13 minutes and cooled. When the composite was stripped from the release paper, the resulting coated fabric was abrasion resistant, resistant to water and common household solvents, had aesthetic appeal, was dry cleanable, and had porosity and breathability.

EXAMPLE 5

A product with a single breathable polymer film was produced as follows. The polyurethane solution of Example 1, including solvent and additives was cast by a roller coater upon a release casting paper (S D Warren VEL) to provide a wet film thickness of 10 to 15 mils. The casting, which measured 8 inches by 10 inches, was then partially dried by subjecting it to hot air (85° C.) in a circulating air over for 30 seconds. While the film was still tacky, a 1.20 cotton sateen fabric was applied to the film by means of a nip roller. The laminate was returned to the oven and it was dried at a temperature of 115° C. for 5 minutes until all the solvent was removed from the film. The laminate was cooled to 20° to 25° C, and the polyurethane coated fabric was stripped from the release paper. The product was a breathable polyurethane coated fabric with a dry film of 3 to 4 mils thickness.

In the process of the invention, the evaporation rate of the solvent in the polyurethane solution is controlled to give the desired size and density of pores in the polyurethane film. The evaporation rate is a function of the drying temperature and temperature gradient, the choice of solvents used in the solution, solution concentration, film thickness, and removal of evaporated solvent from the environment of the drying film. Removal of the solvent vapors is facilitated by passing air or other inert gas through the drying means, so that air velocity and air quality also affect evaporation rate. The configuration of the heating zones also affects the evaporation of the volatile components.

The plastic films and plastic coated fabrics of the invention are breathable in that they are permeable to air and other gases, and to the vapors of water and other liquids. The films and coated fabrics are repellent to liquid phase water and other liquids due to the nature of the pores and character of the plastic surfaces.

In the process of the invention, the first coating step and second coating step can be combined, such as by applying a thicker layer of polyurethane in one step, incompletely evaporating the solvent, and then applying the fabric material. However, the preferred aspect of the invention involves the stepwise application of two coating layers followed by application of the fabric. If desired, more than two coating layers can be applied. The total thickness of the coating layers and the thickness of each individual layer can be varied considerably. Generally, the total coating thickness is in the range of about 1 to 30 mils, preferably about 2 to 10 mils. Each of the coating layers is continuous in the sense that they are continuously applied along the length of the web or carrier as opposed to intermittent application.

Various changes and modifications can be made in the process and products of this invention without departing from the spirit and scope of the invention. The various embodiments of the invention disclosed herein serve to further illustrate the invention but are not intended to limit it.

I claim:
1. A method which comprises the steps of:
   1. applying to a substantially non-porous carrier member a layer of a solution of a film-forming polyurethane in a diluent consisting of a solvent for said polyurethane;
   2. evaporating solvent from said layer to cause the formation of a porous polyurethane film having a thickness of about 1 to 30 mils on said carrier member; and
   3. stripping said carrier member from the polyurethane film.
2. A method which comprises the steps of:
   1. applying a layer of film forming polyurethane solution to a carrier member;
   2. evaporating a portion of the solvent from said layer to form a polyurethane film on said carrier member;
   3. applying a fabric material to said polyurethane film; and
   4. drying the resulting composite structure to cause the formation of a unitary breathable article wherein the polyurethane coating thickness is in the range of about 1 to 30 mils.
3. The method according to claim 2 wherein the carrier member is stripped from the unitary article.
4. A method which comprises the steps of:
   1. applying a first coating of a solution of a film-forming flexible polyurethane to a carrier member;
   2. evaporating at least a portion of the volatile constituents of said first coating whereby the remaining constituents form a solidified film which is strippably adherent to said carrier member;
   3. applying a second coating of a film-forming polymer to said first coating to form a permanent bond therewith;
   4. laying a fabric material on said second coating to interlock the fabric therewith; and
   5. evaporating the volatile constituents of the resulting composite to cause the formation of a unitary, breathable article having a total polymer coating thickness in the range of about 1 to 30 mils.
5. The method according to claim 4 wherein the carrier member is stripped from the unitary article.
6. The method of claim 4 wherein said second coating is a solution of a film-forming flexible polyurethane.
7. The method of claim 6 wherein said first and second coatings comprise a solution of a film-forming, flexible polyesterurethane dissolved in a mixture of dimethylformamide, toluene and methyl ethyl ketone.
8. A polyurethane film produced by the process of claim 1.
9. A polymer coated fabric article consisting essentially of:
   1. a fabric material, and
   2. a continuous, breathable polyurethane film having a thickness of about 1 to 30 mils adherently bonded to said fabric material;
   wherein said article is prepared by a method which comprises the steps of:
      a. applying a layer of film forming polyurethane solution to a carrier member;
      b. evaporating a portion of the solvent from said layer to form a polyurethane film on said carrier member;
      c. applying said fabric material to said polyurethane film;
      d. drying the resulting composite structure to cause the formation of a unitary breathable article; and
      e. stripping said carrier member from said breathable article.
10. A polymer coated fabric article consisting essentially of:
    1. a fabric material;
    2. a first film comprising a continuous, breathable polymer film adherently bonded to the fabric material, and
    3. a second film comprising a continuous, breathable polyurethane film adherently bonded to said first film;
    wherein the total polymer film thickness is in the range from about 1 to 30 mils; said article prepared by a method which comprises the steps of:
       a. applying a first coating of a solution of a film-forming flexible polyurethane to a carrier member;
       b. evaporating at least a portion of the volatile constituents of said first coating whereby the remaining constituents form a solidified film which is strippably adherent to said carrier member;
       c. applying a second coating of a film-forming polymer to said first coating to form a permanent bond therewith;
       d. laying said fabric material on said second coating to interlock the fabric therewith;
       e. evaporating the volatile constituents of the resulting composite to cause the formation of a unitary breathable article; and
       f. stripping said carrier member from said breathable article.
11. The article of claim 10 having a film of carrier material strippably bonded to said second film.
12. The article of claim 10 wherein said first film is a polyurethane film.
13. The article of claim 12 wherein said fabric material is cotton.
14. The article of claim 12 wherein said fabric material is open-cell, foamed polyvinyl chloride.
15. The article of claim 12 wherein said first and second films are polyesterurethanes.

* * * * *